United States Patent
Manolakos et al.

(10) Patent No.: US 11,424,966 B2
(45) Date of Patent: Aug. 23, 2022

(54) PROCEDURES FOR ASSOCIATING A SOUNDING REFERENCE SIGNAL (SRS) RESOURCE TO RANDOM ACCESS CHANNEL (RACH)

(71) Applicant: QUALCOMM Incorporated, San Diego, CA (US)

(72) Inventors: Alexandros Manolakos, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 16/942,115

(22) Filed: Jul. 29, 2020

(65) Prior Publication Data
US 2021/0176095 A1 Jun. 10, 2021

(30) Foreign Application Priority Data
Dec. 5, 2019 (GR) .............................. 20190100545

(51) Int. Cl.
*H04W 76/27* (2018.01)
*H04L 25/02* (2006.01)
(Continued)

(52) U.S. Cl.
CPC ........ *H04L 25/0226* (2013.01); *H04L 5/0051* (2013.01); *H04L 5/10* (2013.01);
(Continued)

(58) Field of Classification Search
CPC .............. H04L 25/0226; H04W 64/00; H04W 74/0833; H04W 76/27
See application file for complete search history.

(56) References Cited

U.S. PATENT DOCUMENTS

2016/0128006 A1* 5/2016 Ji ........................... H04W 72/04
370/350
2018/0110074 A1* 4/2018 Akkarakaran .... H04W 72/0413
(Continued)

FOREIGN PATENT DOCUMENTS

WO 2018075256 A1 4/2018
WO 2019013895 A1 1/2019

OTHER PUBLICATIONS

Intel Corporation: "Design Aspects for NR DL and UL Positioning," 3GPP Draft, 3GPP TSG RAN WG1 Meeting #96, R1-1902513, Intel—NR DLUL POS, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 25, 2019-Mar. 1, 2019, Feb. 16, 2019 (Feb. 16, 2019), XP051600209, 9 pages, Retrieved from the Internet: URL: http://www.3gpp.org/ftp/tsg%5Fran/WG1%5FRL1/TSGR1%5F96/Docs/R1%2D1902513%2Ezip [retrieved on Feb. 16, 2019].
(Continued)

*Primary Examiner* — Fahmida S Chowdhury
(74) *Attorney, Agent, or Firm* — Muncy, Geissler, Olds & Lowe, P.C./Qualcomm

(57) ABSTRACT

Disclosed are techniques for wireless communication. In an aspect, a user equipment (UE) engaged in a positioning session with a transmission-reception point (TRP) receives, during a first state, a configuration of one or more sounding reference signal (SRS) resources, receives a first association between at least one SRS resource of the one or more SRS resources and at least one random access channel (RACH) resource of one or more RACH resources, switches out of the first state during an ongoing positioning session, and transmits, while outside the first state, at least a first signal of a RACH procedure to the TRP using transmission prop-
(Continued)

erties based on the first association between the at least one SRS resource and the at least one RACH resource.

30 Claims, 14 Drawing Sheets

(51) Int. Cl.
    *H04L 5/00*         (2006.01)
    *H04L 5/10*         (2006.01)
    *H04W 64/00*      (2009.01)
    *H04W 74/08*      (2009.01)

(52) U.S. Cl.
    CPC ....... *H04W 64/00* (2013.01); *H04W 74/0833* (2013.01); *H04W 76/27* (2018.02)

(56) References Cited

U.S. PATENT DOCUMENTS

| | | | |
|---|---|---|---|
| 2018/0220392 A1* | 8/2018 | Ly | G01S 5/0236 |
| 2018/0220468 A1* | 8/2018 | Lin | H04W 74/008 |
| 2018/0262313 A1* | 9/2018 | Nam | H04L 5/0044 |
| 2018/0324850 A1* | 11/2018 | Amuru | H04L 5/0053 |
| 2019/0215870 A1* | 7/2019 | Babaei | H04L 5/001 |
| 2019/0281535 A1* | 9/2019 | Wei | H04W 48/16 |
| 2020/0037385 A1* | 1/2020 | Park | H04W 16/28 |
| 2020/0146054 A1* | 5/2020 | Jeon | H04L 5/0053 |
| 2021/0105820 A1* | 4/2021 | Kim | H04B 7/0695 |
| 2021/0144716 A1* | 5/2021 | Choi | H04W 72/042 |
| 2022/0086765 A1* | 3/2022 | Zhang | H04W 52/36 |

OTHER PUBLICATIONS

Intel Corporation: "Potential Enhancements of NR Positioning Design," 3GPP Draft, 3GPP TSG RAN WG1 Meeting #102-E, R1-2005879, 3rd Generation Partnership Project (3GPP), Mobile Competence Centre, 650, Route Des Lucioles, F-06921, Sophia-Antipolis Cedex, France, vol. RAN WG1. No. e-Meeting, Aug. 17, 2020-Aug. 28, 2020, Aug. 8, 2020 (Aug. 8, 2020), XP051917781, 10 pages, Retrieved from the Internet: URL: https://ftp.3gpp.org/tsg_ran/WG1_RL1/TSGR1_102-e/Docs/R1-2005879.zip R1-2005879 Intel—NRP R17 Enhancements.docx [retrieved on Aug. 8, 2020].
International Search Report and Written Opinion—PCT/US2020/054288—ISA/EPO—dated Apr. 8, 2021.
Nokia., et al., "Views on Physical Layer Procedures for NR Positioning", 3GPP Draft, 3GPP TSG RAN WG1 #96bis, R1-1905264, PHY Procedures, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 2, 2019 (Apr. 2, 2019), XP051707401, 6 Pages, Retrieved from the Internet: URL: http://www.3gpp.org/ftp/tsg%5Fran/WG1%5FRL1/TSGR1%5F96b/Docs/R1%2D1905264%2Ezip. [retrieved on Apr. 2, 2019] the whole document.
Partial International Search Report—PCT/US2020/054288—ISA/EPO—dated Jan. 29, 2021.
Samsung: "UL Reference Signals for NR Positioning," 3GPP Draft, 3GPP TSG RAN WG1 #98, R1-1908510, NR Positioning UL RS Design SS V3, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Aug. 16, 2019 (Aug. 16, 2019), XP051765118, 6 pages, Retrieved from the Internet: URL: http://www.3gpp.org/ftp/tsg_ran/WG1_RL1/TSGR1_98/Docs/R1-1908510.zip [retrieved on Aug. 16, 2019] the whole document.
Xiaomi: "Positioning Enhancements for RRC IDLE and RRC INACTIVE state UE," 3GPP Draft, 3GPP TSG RAN WG2 #111, R2-2007173, 3rd Generation Partnership Project (3GPP), Mobile Competence Centre, 650, Route Des-Lucioles, F-06921, Sophia-Antipolis Cedex, France, vol. RAN WG2. No. e-Meeting; Aug. 17, 2020-Aug. 28, 2020, Aug. 7, 2020 (Aug. 7, 2020), XP051911993, 4 pages, Retrieved from the Internet: URL: https://ftp.3gpp.org/tsg_ran/WG2_RL2/TSGR2_111-e/Docs/R2-2007173.zip R2-2007173 Positioning enhancements for RRC IDLE and RRC INACTIVE state UE.

* cited by examiner

PROCEDURES FOR ASSOCIATING A SOUNDING REFERENCE SIGNAL (SRS) RESOURCE TO RANDOM ACCESS CHANNEL (RACH)

CROSS-REFERENCE TO RELATED APPLICATIONS

The present application for patent claims priority under 35 U.S.C. § 119 to Greek Patent Application No. 20190100545, entitled "PROCEDURES FOR ASSOCIATING A SOUNDING REFERENCE SIGNAL (SRS) RESOURCE TO RANDOM ACCESS CHANNEL (RACH)," filed Dec. 5, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, during a first state, a configuration of one or more sounding reference signal (SRS) resources; obtaining a first association between at least one SRS resource or resource set of the one or more SRS resources and at least one random access channel (RACH) resource of one or more RACH resources; and transmitting, while outside the first state, at least a first signal of a RACH procedure to a transmission-reception point (TRP) using transmission properties based on the first association between the at least one SRS resource or resource set and the at least one RACH resource.

In an aspect, a method of wireless communication performed by a TRP includes receiving, from a UE, one or more SRS on one or more SRS resources; receiving, from the UE during a positioning session with the UE, at least a first signal of a RACH procedure having transmission properties based on a first association between at least one SRS resource or resource set of the one or more SRS resources and at least one RACH resource of one or more RACH resources; and performing a positioning measurement of the first signal of the RACH procedure.

In an aspect, a UE includes a memory; at least one transceiver; and at least one processor communicatively coupled to the memory and the at least one transceiver, the at least one processor configured to: receive, during a first state, a configuration of one or more SRS resources; obtain a first association between at least one SRS resource or resource set of the one or more SRS resources and at least one RACH resource of one or more RACH resources; and transmit, while outside the first state, at least a first signal of a RACH procedure to a TRP using transmission properties based on the first association between the at least one SRS resource or resource set and the at least one RACH resource.

In an aspect, a TRP includes a memory; at least one transceiver; and at least one processor communicatively coupled to the memory and the at least one transceiver, the at least one processor configured to: receive, from a UE, one or more SRS on one or more SRS resources; receive, from the UE during a positioning session with the UE, at least a first signal of a RACH procedure having transmission properties based on a first association between at least one SRS resource or resource set of the one or more SRS resources and at least one RACH resource of one or more RACH resources; and perform a positioning measurement of the first signal of the RACH procedure.

In an aspect, a UE includes means for receiving, during a first state, a configuration of one or more SRS resources; means for obtaining a first association between at least one SRS resource or resource set of the one or more SRS resources and at least one RACH resource of one or more RACH resources; and means for transmitting, while outside the first state, at least a first signal of a RACH procedure to a TRP using transmission properties based on the first association between the at least one SRS resource or resource set and the at least one RACH resource.

In an aspect, a TRP includes means for receiving, from a UE, one or more SRS on one or more SRS resources; means for receiving, from the UE during a positioning session with the UE, at least a first signal of a RACH procedure having transmission properties based on a first association between at least one SRS resource or resource set of the one or more SRS resources and at least one RACH resource of one or more RACH resources; and means for performing a positioning measurement of the first signal of the RACH procedure.

In an aspect, a non-transitory computer-readable medium storing computer-executable instructions includes computer-executable instructions comprising at least one instruction instructing a UE to receive, during a first state, a configuration of one or more SRS resources; at least one instruction instructing the UE to obtain a first association between at least one SRS resource or resource set of the one or more SRS resources and at least one RACH resource of one or more RACH resources; and at least one instruction instructing the UE to transmit, while outside the first state, at least a first signal of a RACH procedure to a TRP using transmission properties based on the first association between the at least one SRS resource or resource set and the at least one RACH resource.

In an aspect, a non-transitory computer-readable medium storing computer-executable instructions includes computer-executable instructions comprising at least one instruction instructing a TRP to receive, from a UE, one or more SRS on one or more SRS resources; at least one instruction instructing the TRP to receive, from the UE during a positioning session with the UE, at least a first signal of a RACH procedure having transmission properties based on a first association between at least one SRS resource or resource set of the one or more SRS resources and at least one RACH resource of one or more RACH resources; and at least one instruction instructing the TRP to perform a positioning measurement of the first signal of the RACH procedure.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
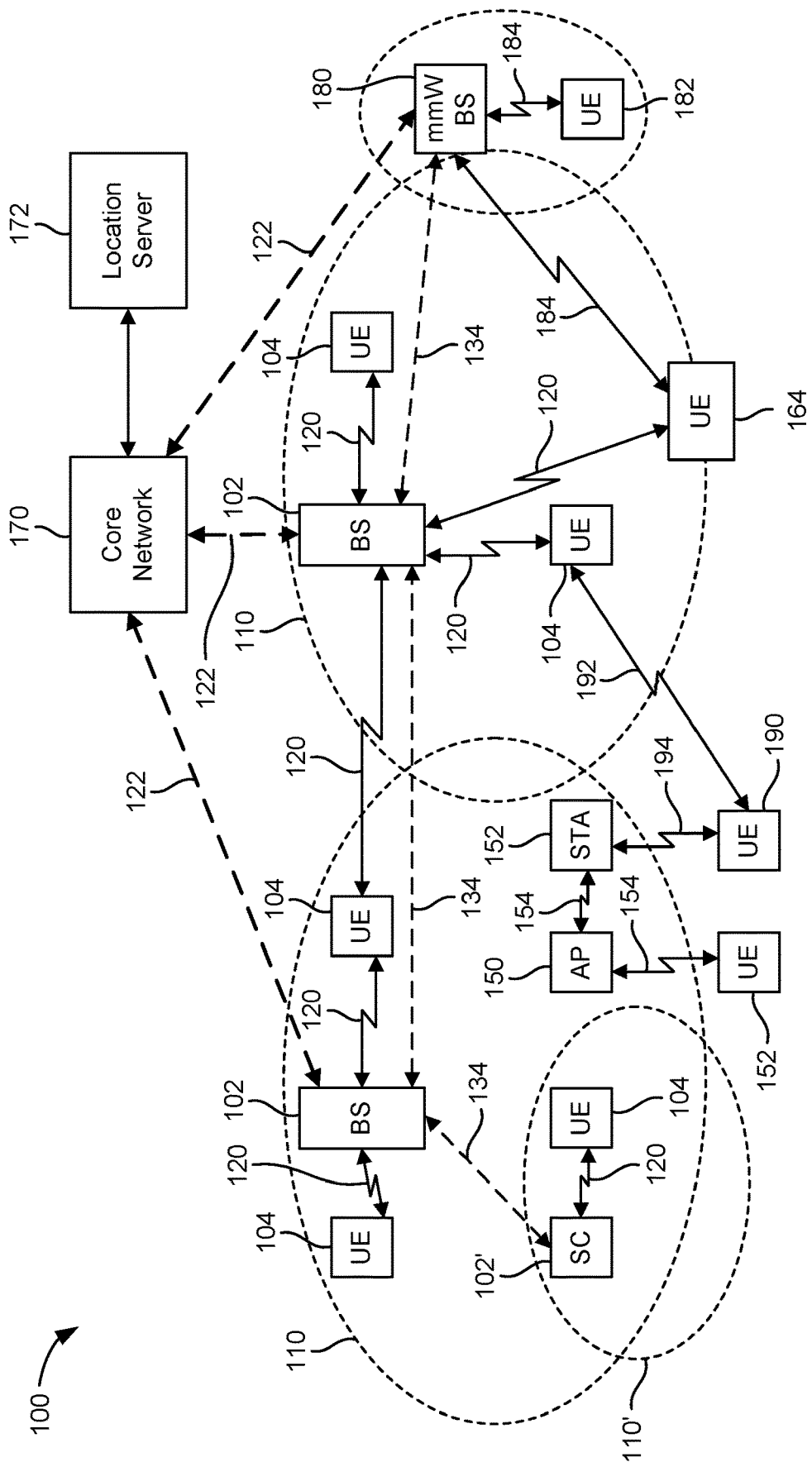
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
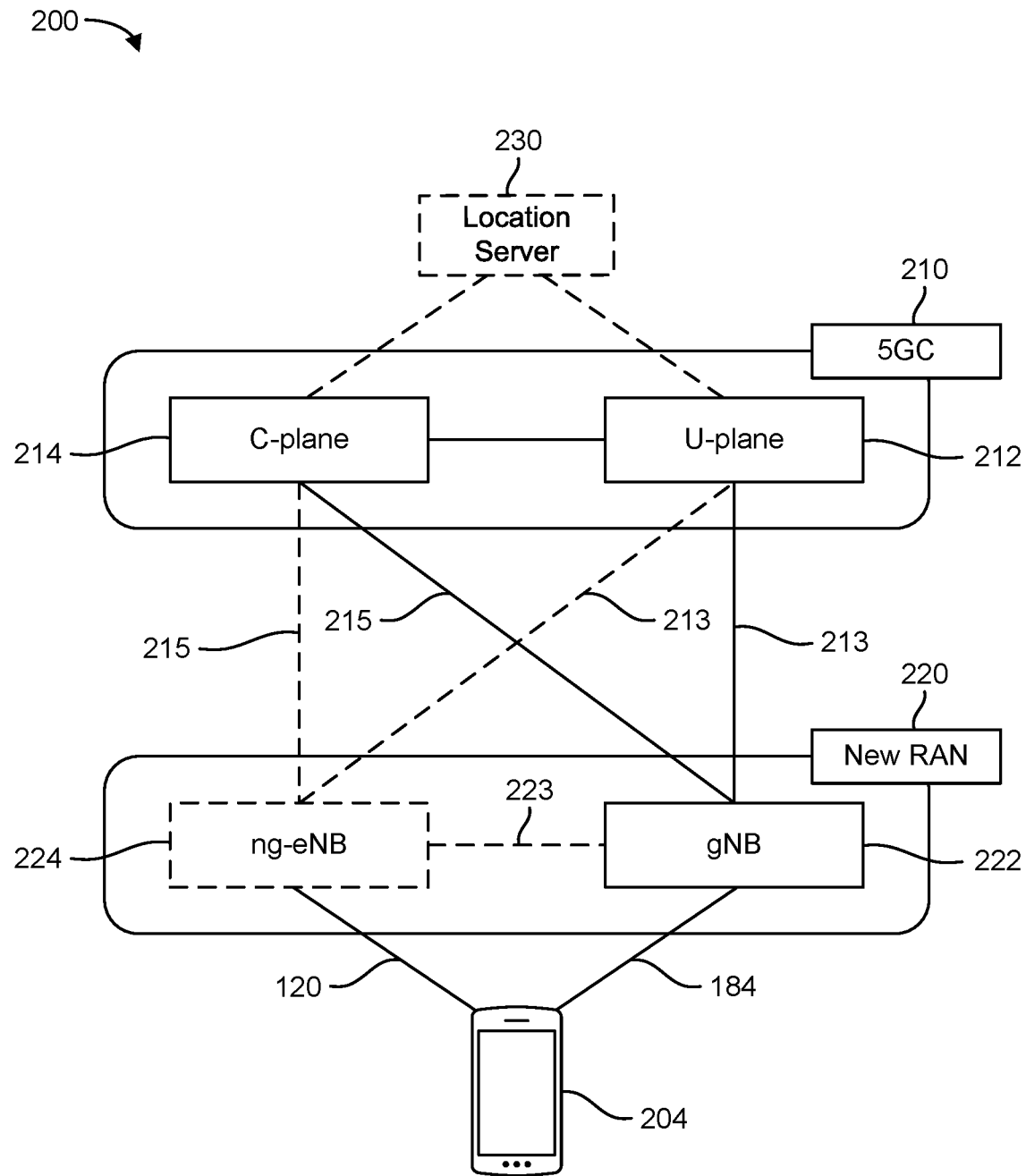
FIGS. 2A and 2B illustrate example wireless network structures, according to various aspects.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
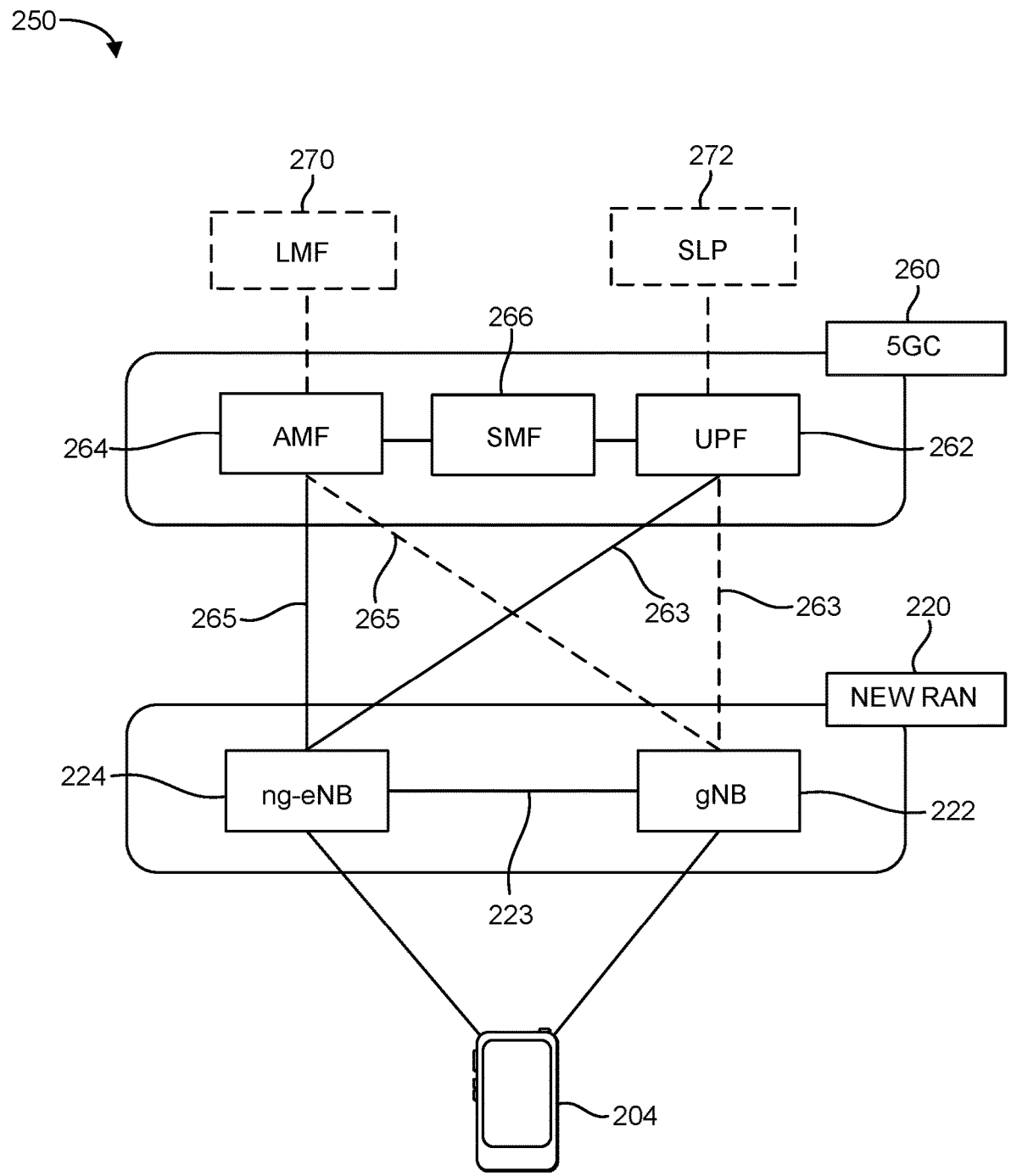

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
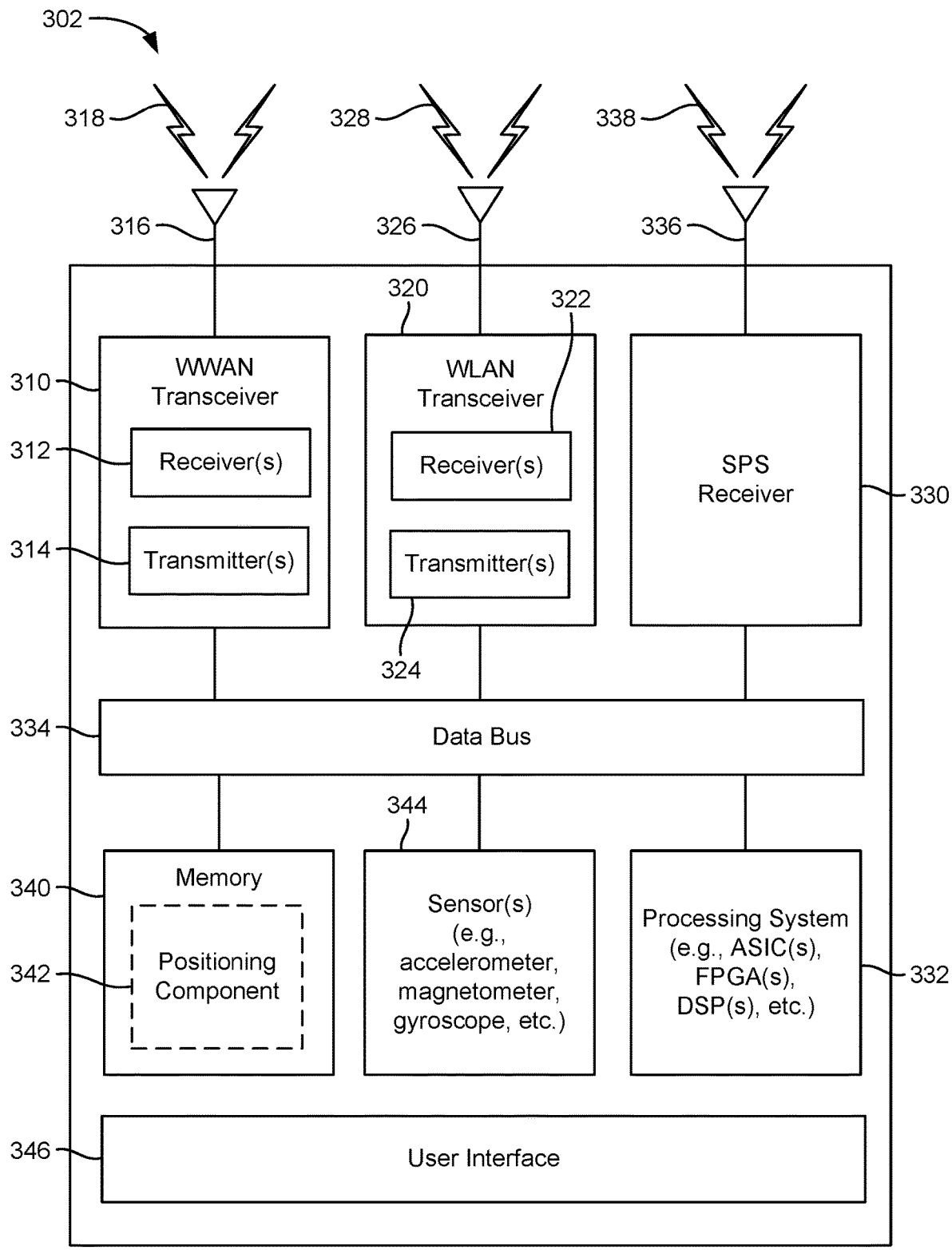
FIGS. 3A to 3C are simplified block diagrams of several sample aspects of components that may be employed in wireless communication nodes and configured to support communication as taught herein.
Figure 3B:
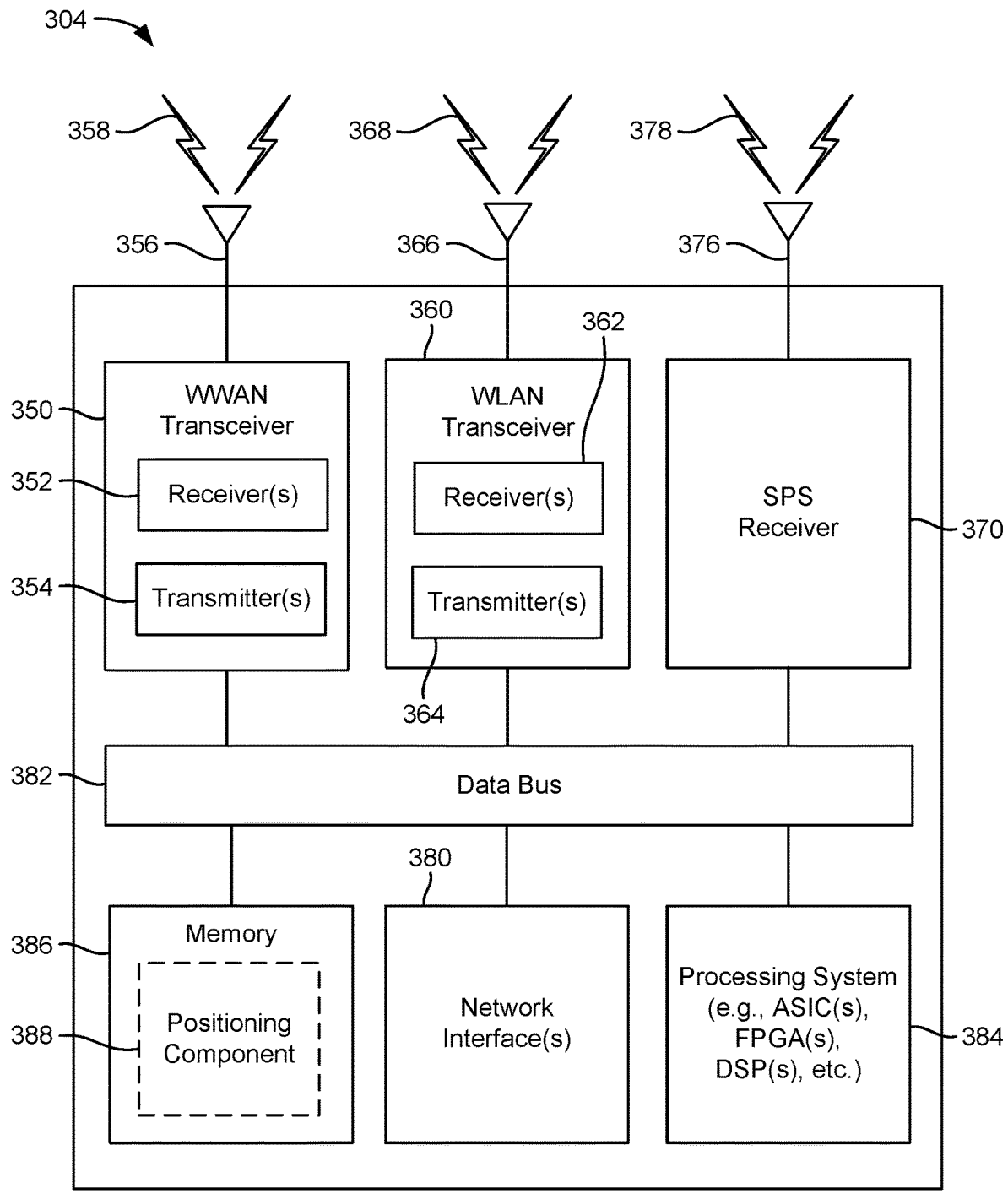
Figure 3C:
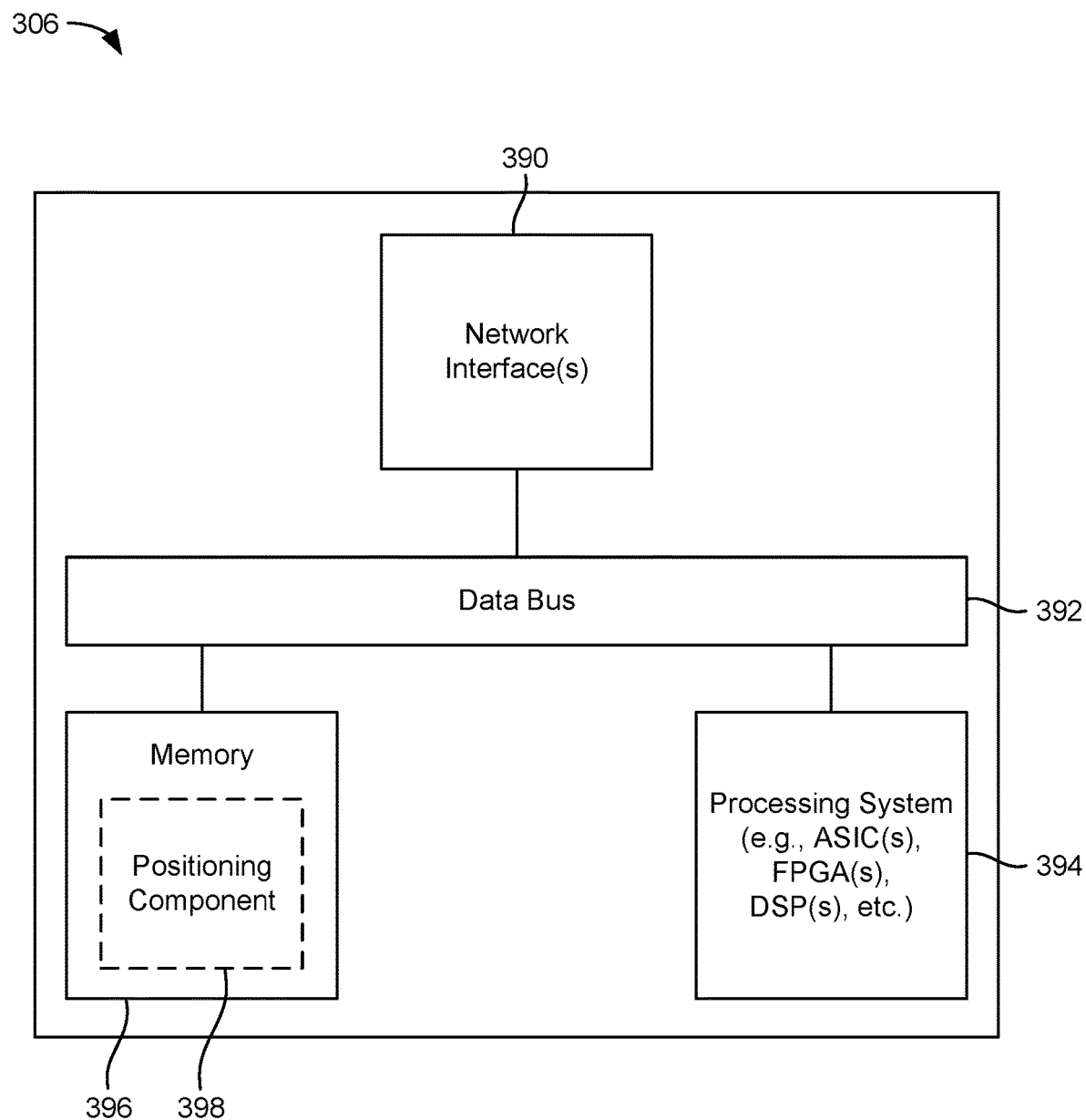

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

In an aspect, the WWAN transceiver 310, the WLAN transceiver, and/or the SPS receiver 330 may share the same receiver(s) and/or transmitter(s). That is, the receiver(s) 312, the receiver(s) 322, and/or the SPS receiver 330 may be the same receiver(s), and/or the transmitter(s) 314 and the transmitter(s) 324 may be the same transmitter(s). This may be the case where the WWAN transceiver 310, the WLAN transceiver, and/or the SPS receiver 330 are integrated into a single communication device. Alternatively, the WWAN transceiver 310, the WLAN transceiver, and/or the SPS receiver 330 may be separate (discrete) communication devices.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
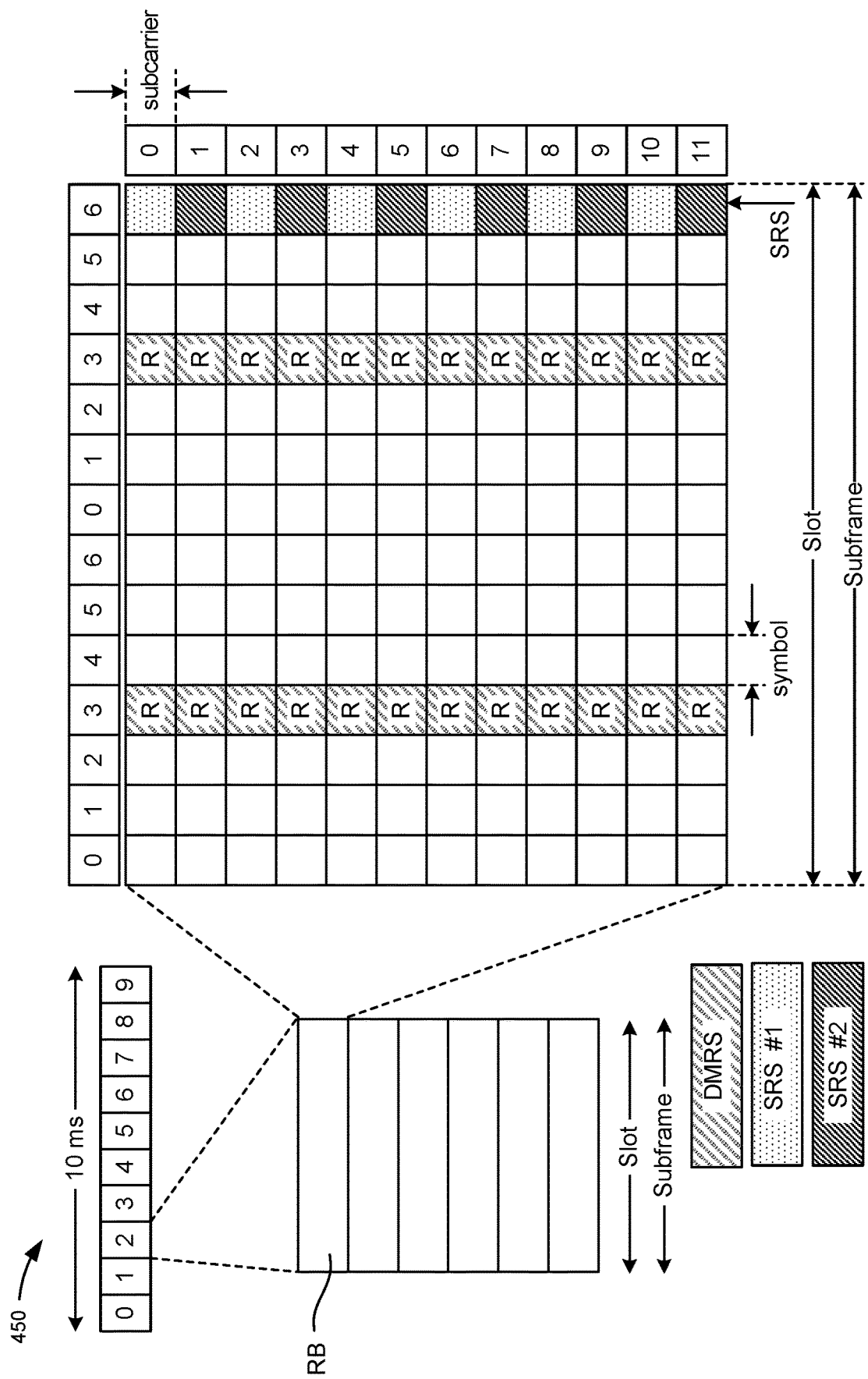
FIGS. 4A and 4B are diagrams illustrating examples of frame structures and channels within the frame structures, according to aspects of the disclosure.
Figure 4B:
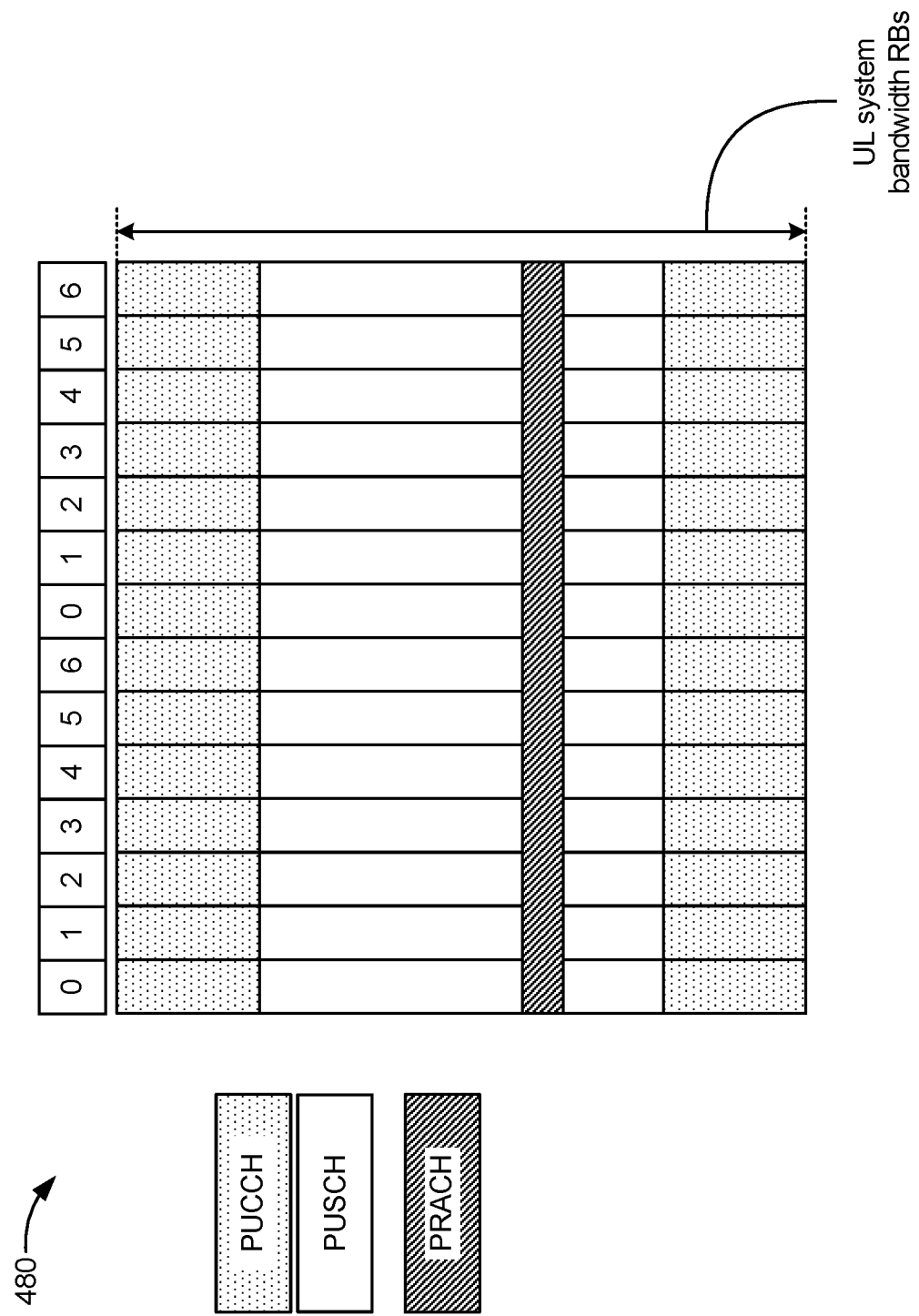

Various frame structures may be used to support downlink and uplink transmissions between network nodes (e.g., base stations and UEs). FIG. 4A is a diagram 450 illustrating an example of an UL frame structure, according to aspects of the disclosure. FIG. 4B is a diagram 480 illustrating an example of channels within the UL frame structure, according to aspects of the disclosure. Other wireless communications technologies may have different frame structures and/or different channels.

In the example of FIGS. 4A and 4B, a numerology of 15 kHz is used. Thus, in the time domain, a frame (e.g., 10 milliseconds (ms)) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Sub- frame | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

As illustrated in FIG. 4A, some of the REs carry demodulation reference signals (DMRS) for channel estimation at the base station. The UE may additionally transmit sounding reference signals (SRS) in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4A, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4B illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UL-TDOA), multi-round-trip-time (multi-RTT), angle-of-arrival (AoA), etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLoss-Reference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Figure 5:
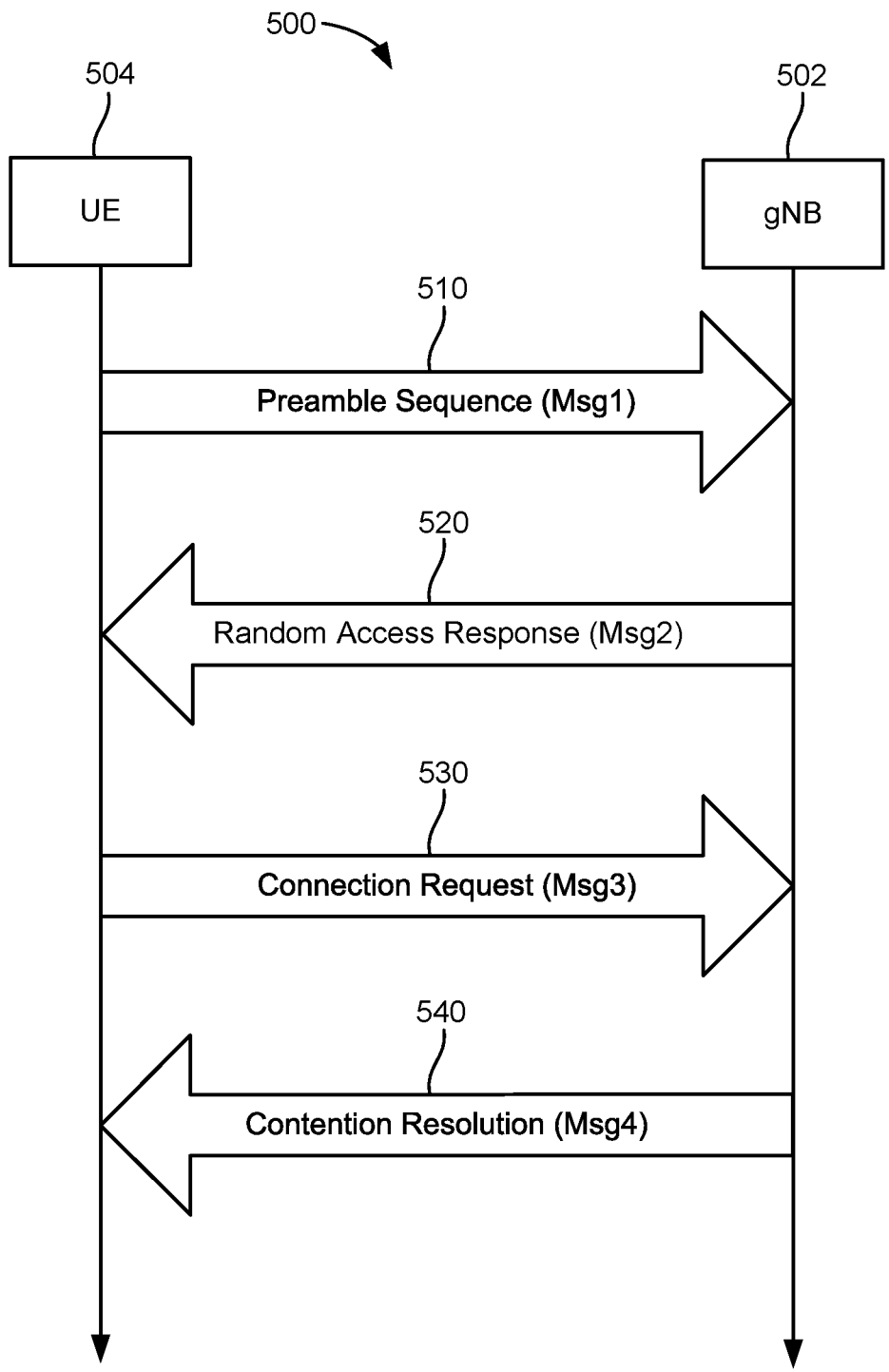
FIGS. 5 and 6 illustrate exemplary random access procedures, according to aspects of the disclosure.

FIG. 5 illustrates an exemplary four-step random access procedure 500, according to aspects of the disclosure. The four-step random access procedure 500 is performed between a UE 504 and a base station 502, which may correspond to any of the UEs and base stations, respectively, described herein.

There are various situations in which a UE may perform the four-step random access procedure 500 (also referred to as a "RACH procedure," a "PRACH procedure," and the like). For example, a UE may perform the four-step random access procedure 500 when acquiring initial network access after coming out of the RRC idle state, when performing an RRC connection re-establishment procedure, during a handover, when downlink or uplink data arrives and the UE is in an RRC connected state but its uplink synchronization status is "not-synchronized," when transitioning out of the RRC INACTIVE state, when establishing time alignment for the addition of an SCell, when requesting other synchronization information, or when performing beam failure recovery.

Before performing the four-step random access procedure 500, the UE 504 first reads one or more SSBs broadcasted by the base station 502 with which the UE 504 is performing the four-step random access procedure 500. In NR, each beam transmitted by a base station (e.g., base station 502) is associated with a different SSB, and a UE (e.g., UE 504) selects a certain beam to use to communicate with the base station 502. Based on the SSB of the selected beam, the UE 504 can then read the SIB type 1 (SIB1), which carries cell access related information and supplies the UE 504 with the scheduling of other system information blocks, transmitted on the selected beam.

When the UE sends the very first message of the four-step random access procedure 500 to the base station 502, it sends a specific pattern called a preamble (also referred to as a RACH preamble, a PRACH preamble, or a sequence). The RACH preamble differentiates requests from different UEs 504. However, if two UEs 504 use the same RACH preamble at the same time, then there can be a collision. There are a total of 64 such patterns available to a UE 504, and, for contention-based random access, the UE 504 chooses one of them randomly. For contention-free random access, however, the network instructs the UE 504 about which one to use.

At 510, the UE 504 selects one of 64 RACH preambles to send to the base station 502 as a RACH request. This message is referred to as "Message 1" or "Msg1" in a four-step RACH procedure. Based on the synchronization information from the base station 502 (i.e., the SIB1), the UE 504 selects a RACH preamble and sends it at the RACH occasion (RO) corresponding to the selected SSB/beam. More specifically, in order for the base station 502 to determine which beam the UE 504 has selected, a specific mapping is defined between an SSB and an RO (which occur every 10, 20, 40, 80, or 160 ms). By detecting at which RO the UE 504 sent the preamble, the base station 502 can determine which SSB/beam the UE 504 selected.

Note that an RO is a time-frequency transmission opportunity for transmitting a RACH preamble, and a RACH preamble index (i.e., a value from 0 to 63 for the 64 possible preambles) enables the UE 504 to generate the type of RACH preamble expected at the base station 502. The RO and RACH preamble index may be configured to the UE 504 by the base station 502 in a SIB. A RACH resource is an RO in which one RACH preamble index is transmitted. As such, the terms "RO" (or "RACH occasion") and "RACH resource" may be used interchangeably, depending on the context.

Due to reciprocity, the UE 504 may use the uplink transmit beam corresponding to the best downlink receive beam determined during synchronization (i.e., the best receive beam to receive the selected downlink beam from the base station 502). That is, the UE 504 uses the parameters of the downlink receive beam used to receive the beam from the base station 502 to determine the parameters of the uplink transmit beam. If reciprocity is available at the base station 502, the UE 504 can transmit the preamble over one beam. Otherwise, the UE 504 repeats transmission of the same preamble on all of its uplink transmit beams.

The UE 504 also needs to provide its identity to the network (via base station 502) so that the network can address it in the next step. This identity is called the random access radio network temporary identity (RA-RNTI) and is determined from the time slot in which the RACH preamble is sent. If the UE 504 does not receive any response from the base station 502 within some period of time, it increases its transmission power in a fixed step and sends the RACH preamble/Msg1 again.

At 520, the base station 502 sends a random access response (RAR), referred to as a "Message 2" or "Msg2" in a four-step RACH procedure, to the UE 504 on the selected beam. The RAR is sent on a PDSCH and is addressed to the RA-RNTI calculated from the time slot (i.e., RO) in which the preamble was sent. The RAR carries the following information: a cell-radio network temporary identifier (C-RNTI), a timing advance (TA) value, and an uplink grant resource. The base station 502 assigns the C-RNTI to the UE 504 to enable further communication with the UE 504. The TA value specifies how much the UE 504 should change its timing to compensate for the round-trip delay between the UE 504 and the base station 502. The uplink grant resource indicates the initial resources the UE 504 can use on the PUSCH. After this step, the UE 504 and the base station 502 establish coarse beam alignment that can be utilized in the subsequent steps.

At 530, using the allocated PUSCH, the UE 504 sends an RRC connection request message, referred to as a "Message 3" or "Msg3," to the base station 502. Because the UE 504 sends the Msg3 over the resources scheduled by the base station 502, the base station 502 therefore knows where to detect the Msg3 and which uplink receive beam should be used. Note that the Msg3 PUSCH can be sent on the same or different uplink transmit beam than the Msg1.

The UE 504 identifies itself in the Msg3 by the C-RNTI assigned in the previous step. The message contains the UE's 504 identity and connection establishment cause. The UE's 504 identity is either a temporary mobile subscriber identity (TMSI) or a random value. A TMSI is used if the UE 504 has previously connected to the same network. The UE 504 is identified in the core network by the TMSI. A random value is used if the UE 504 is connecting to the network for the very first time. The reason for the random value or TMSI is that the C-RNTI may have been assigned to more than one UE in the previous step, due to multiple requests arriving at the same time. The connection establishment cause indicates the reason why the UE 504 needs to connect to the network, and will be described further below.

At 540, if the Msg3 was successfully received, the base station 502 responds with a contention resolution message, referred to as a "Message 4" or "Msg4." This message is addressed to the TMSI or random value (from the Msg3) but contains a new C-RNTI that will be used for further communication. Specifically, the base station 502 sends the Msg4 in the PDSCH using the downlink transmit beam determined in the previous step.

The four-step random access procedure 500 described above is a contention-based random access procedure. In contention-based random access, any UE 504 connecting to the same cell or TRP sends the same request, in which case there is a possibility of collision among the requests from the various UEs 504. In contention-free random access, the network can instruct a UE 504 to use some unique identity to prevent its request from colliding with requests from other UEs. A contention-free random access procedure can be performed when the UE 504 is in an RRC connected mode before the random access procedure, such as in the case of a handover.

Figure 6:
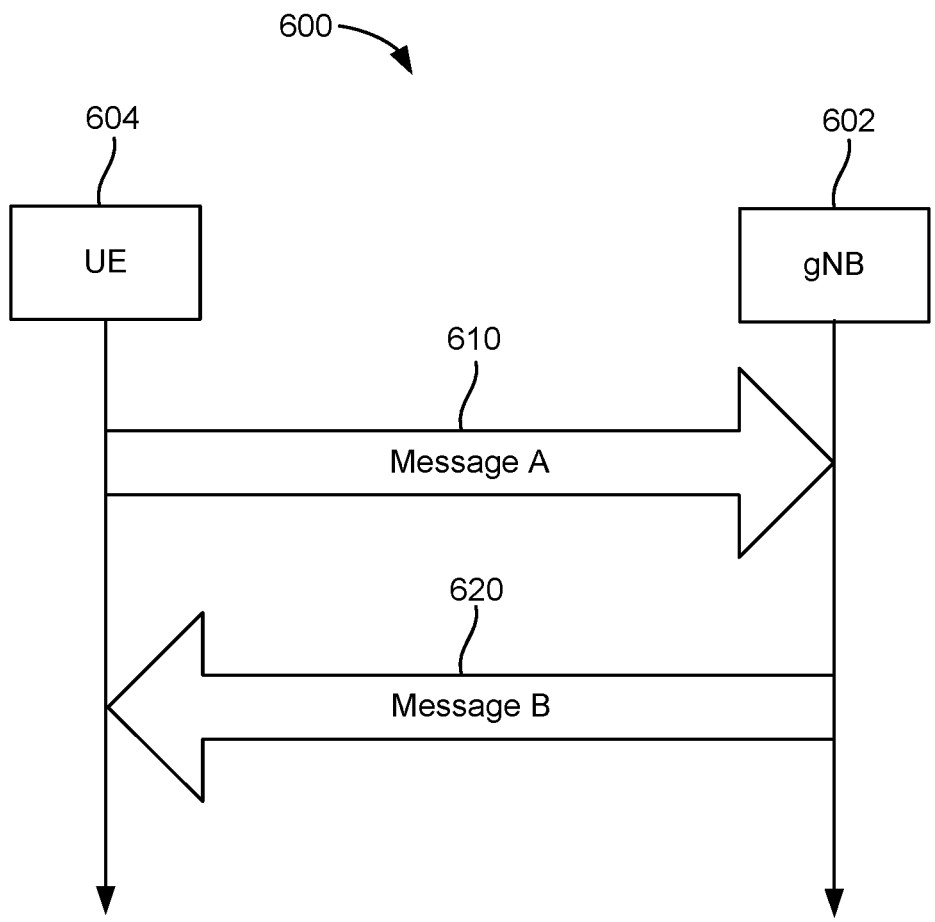

FIG. 6 illustrates an exemplary two-step random access procedure 600, according to aspects of the disclosure. The two-step random access procedure 600 may be performed between a UE 604 (e.g., any of the UEs described herein) and a base station 602 (e.g., any of the base stations described herein).

At 610, the UE 604 transmits a RACH Message A ("MsgA") to the base station 602. In a two-step random access procedure 600, Msg1 and Msg3, described above with reference to FIG. 5, are collapsed (e.g., combined) into MsgA and sent to the base station 602. As such, a MsgA includes a RACH preamble and a PUSCH, similar to the Msg3 PUSCH of a four-step RACH procedure. The RACH preamble may have been selected from 64 possible preambles, as described above with reference to FIG. 5, and may be used as a reference signal for demodulation of the data transmitted in the MsgA. At 620, the UE 604 receives a RACH Message B ("MsgB") from the base station 602. The MsgB may be a combination of Msg2 and Msg4 described above with reference to FIG. 5.

The combination of Msg1 and Msg3 into one MsgA and the combination of Msg2 and Msg4 into one MsgB allows the UE 604 to reduce the RACH procedure setup time to support the low-latency requirements of 5G NR. Although the UE 604 may be configured to support the two-step random access procedure 600, the UE 604 may still support the four-step random access procedure 500 as a fall back if the UE 604 is not be able to use the two-step random access procedure 600 due to some constraints (e.g., high transmit power requirements, etc.). Therefore, a UE in 5G/NR may be configured to support both the two-step and the four-step random access procedures, and may determine which random access procedure to configure based on the RACH configuration information received from the base station.

After the random access procedure 500/600, the UE 504/604 is in an RRC connected state. The RRC protocol is used on the air interface between a UE and a base station. The major functions of the RRC protocol include connection establishment and release functions, broadcast of system information, radio bearer establishment, reconfiguration and release, RRC connection mobility procedures, paging notification and release, and outer loop power control. In LTE, a UE may be in one of two RRC states (connected or idle), and in NR, a UE may be in one of three RRC states (connected, idle, or inactive). The different RRC states have different radio resources associated with them that the UE can use when it is in a given state.

Figure 7:
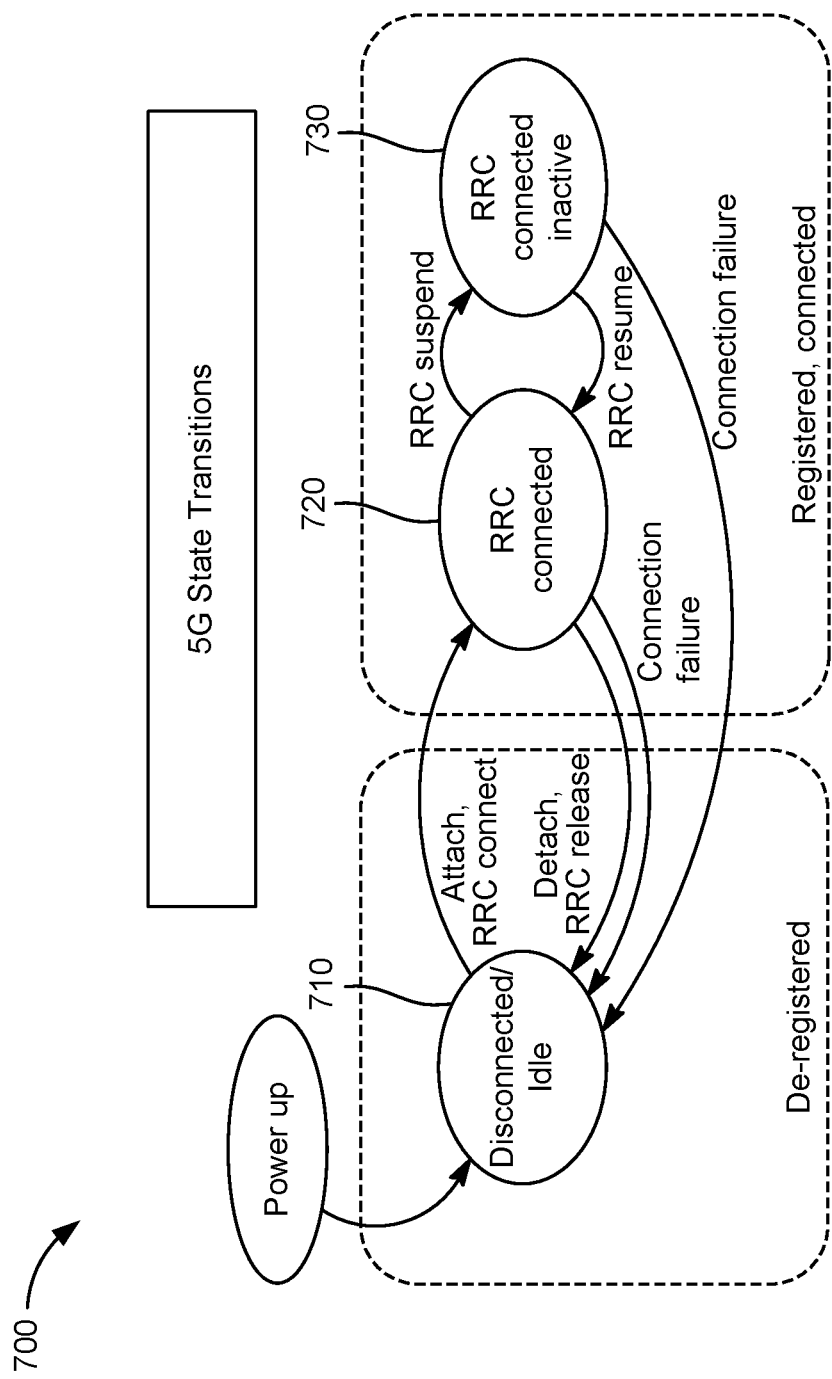
FIG. 7 illustrates the different radio resource control (RRC) states in NR, according to aspects of the disclosure.

FIG. 7 illustrates the different RRC states in NR, according to aspects of the disclosure. When a UE is powered up, it is initially in the RRC disconnected/idle state 710. After the random access procedure 500 or 600, it moves to the RRC connected state 720. If there is no activity from UE for a short time, it can suspend its session by moving to the RRC inactive state 730. The UE can resume its session by performing a random access procedure 500 or 600 to transition back to the RRC connected state 720. Thus, the UE needs to perform a random access procedure 500 or 600 to transition to the RRC connected state 720, regardless of whether the UE is in the RRC idle state 710 or the RRC inactive state 730.

The operations performed in the RRC idle state 710 include public land mobile network (PLMN) selection, broadcast of system information, cell re-selection mobility, paging for mobile terminated data (initiated and managed by the 5GC), discontinuous reception (DRX) for core network paging (configured by NAS). The operations performed in the RRC connected state 720 include 5GC (e.g., 5GC 260) and New RAN (e.g., New RAN 220) connection establishment (both control and user planes), UE context storage at the New RAN and the UE, New RAN knowledge of the cell to which the UE belongs, transfer of unicast data to/from the UE, and network controlled mobility. The operations performed in the RRC inactive state 730 include the broadcast of system information, cell re-selection for mobility, paging (initiated by the New RAN), RAN-based notification area (RNA) management (by the New RAN), DRX for RAN paging (configured by the New RAN), 5GC and New RAN connection establishment for the UE (both control and user planes), storage of the UE context in the New RAN and the UE, and New RAN knowledge of the RNA to which the UE belongs.

In some cases, the UE may transition from the RRC connected state 720 to the RRC idle state 710 or the RRC inactive state 730 during an ongoing positioning session, such as a multi-round-trip-time (multi-RTT) session (which may be uplink-only or downlink-and-uplink), an uplink time difference of arrival (UL-TDOA) session (uplink-only), an uplink angle-of-arrival (UL-AoA) session (uplink-only), and the like.

In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT (also referred to as "multi-cell-RTT") positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

In an UL-TDOA session, the UE transmits uplink reference signals (e.g., SRS) that are received by a reference base station and one or more non-reference base stations. The base stations report the times of arrival (ToAs) of the uplink reference signals to a positioning entity (e.g., the UE, the serving base station, location server 230, LMF 270, SLP 272), which calculates the reference signal time difference (RSTD) of the uplink reference signals between the reference base station and each non-reference base station. Based on the known locations of the involved base stations and the RSTD measurements, the positioning entity can estimate the UE's location.

Unlike multi-RTT and UL-TDOA positioning methods, which require three or more base stations to measure signals from the UE, an UL-AoA session can be performed between a UE and a single base station. In an UL-AoA procedure, For UL-AoA positioning, a base station measures the angle and other channel properties (e.g., gain level) of the uplink receive beam used to communicate with a UE to estimate the location of the UE. The UE and the base station may also perform an RTT procedure to further refine the location estimate.

There are various reasons that a UE may transition from the RRC connected state 720 to the RRC idle state 710 or the RRC inactive state 730 during an ongoing positioning session. For example, the DRX cycle with which the UE has been configured may call for the UE to transition into the RRC inactive state 730, or the UE's serving base station may instruct the UE to transition into the RRC inactive state 730, or the UE may become disconnected from the network for some reason and transition to the RRC idle state 710. Whatever the reason, it would be beneficial for the UE to be able to leverage the subsequent random access procedure 500 or 600 to continue the ongoing positioning session before the UE transitions back to the RRC connected state 720.

Figure 8:
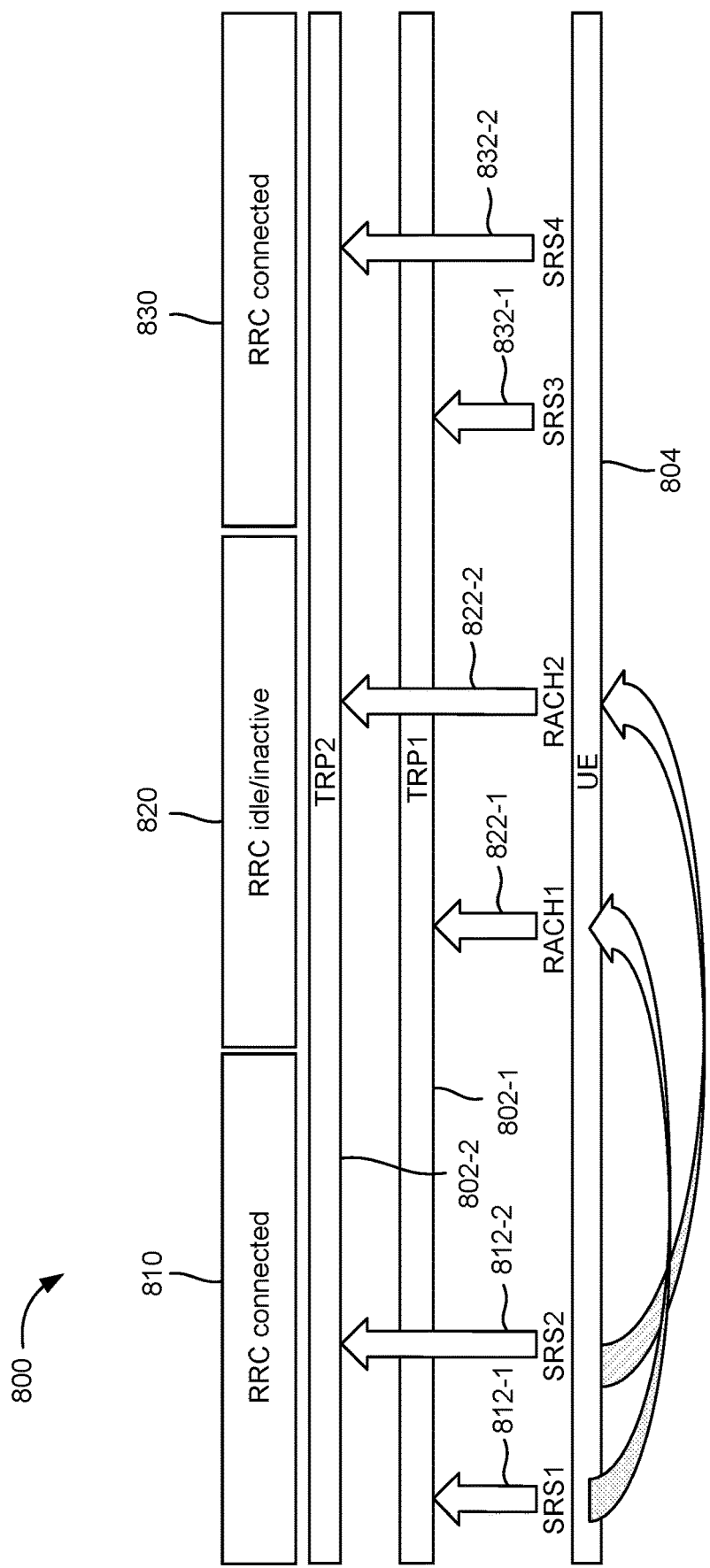
FIG. 8 is a diagram of an exemplary positioning procedure between a UE and two TRPs, according to aspects of the disclosure.

Accordingly, the present disclosure provides techniques for associating SRS resources to RACH resources for a UE in an RRC idle state 710 or an RRC inactive state 730 during an uplink-only (e.g., AoA, UL-TDOA) or uplink-downlink (e.g., RTT) positioning session. FIG. 8 is a diagram 800 of an exemplary positioning procedure between a UE 804 and two TRPs 802-1 and 802-2 (collectively, TRPs 802), according to aspects of the disclosure. The UE 804 may correspond to any of the UEs described herein, and the TRPs 802 may correspond to (or be TRPs of) any of the base stations described herein. The positioning session may be a multi-RTT session, an UL-TDOA session, an UL-AoA session, or the like.

During a first RRC connected state 810 (which may correspond to the RRC connected state 720), the UE 804 is configured with a first set of one or more SRS resources on which to transmit one or more SRS 812 to the TRPs 802 for the positioning session. Specifically, the UE 804 is configured with one or more SRS resources on which to transmit one or more SRS 812-1 (labeled "SRS1") to the TRP 802-1, and with one or more SRS resources on which to transmit one or more SRS 812-2 (labeled "SRS2") to the TRP 802-2. In an aspect, the one or more SRS resources may be an SRS resource set.

While in the first RRC connected state 810, the UE 804 obtains a first association of at least one SRS resource (or at least one SRS resource set) of the one or more SRS resources to at least one RACH resource of one or more RACH resources for each TRP 802. More specifically, the UE 804 obtains an association of at least one SRS resource (or at least one SRS resource set) of the one or more SRS resources on which the one or more SRS 812-1 were transmitted to at least one RACH resource of one or more RACH resources allocated for transmission of RACH messages (e.g., Msg1, Msg3, MsgA) to the TRP 802-1. Similarly, the UE 804 obtains an association of at least one SRS resource (or at least one SRS resource set) of the one or more SRS resources on which the one or more SRS 812-2 were transmitted to at least one RACH resource of one or more RACH resources allocated for transmission of RACH messages (e.g., Msg1, Msg3, MsgA) to the TRP 802-2. The UE 804 may receive (be configured with) the associations from the serving TRP (e.g., one of TRP 802-1 and 802-2) or the respective TRPs 802-1 and 802-2. In an aspect, the association may be received with the SRS resource configuration or in a separate transmission. The at least one SRS resource may be, for example, one or more SRS resources, an SRS resource set, or the like.

Subsequently, the UE 804 transitions to an RRC idle state or an RRC inactive state 820. This may be, for example, due to a command from the serving TRP (e.g., one of TRPs 802-1 and 802-2), the expiration of a DRX timer, or the like. When the UE 804 determines to switch from the RRC idle/inactive state 820 to a second RRC connected state 830, it uses the configured association between the SRS resources (or SRS resource sets) and the RACH resources received during the RRC connected state 810 to transmit the RACH message(s) 822 (e.g., a Msg1 and Msg3, or a MsgA) of the associated random access procedures (e.g., random access procedure 500/600). More specifically, the UE 804 transmits the RACH message(s) 822-1 (e.g., a Msg1 and Msg3 or a MsgA) to the TRP 802-1 using transmission properties inherited from at least one associated SRS resource (or SRS resource set) on which the SRS 812-1 was/were transmitted. Similarly, the UE 804 transmits the RACH message(s) 822-2 (e.g., a Msg1 and Msg3 or a MsgA) to the TRP 802-2 using transmission properties inherited from at least one associated SRS resource (or SRS resource set) on which the SRS 812-2 was/were transmitted. The TRPs 802 measure the RACH messages on the associated RACH resources as they would an SRS-for-positioning resource (e.g., ToA, AoA, etc.). The transmission properties inherited from the at least one associated SRS resource may include an uplink spatial transmit filter of the at least one SRS resource, a path-loss reference resource, path-loss estimate, and/or transmission power estimate of the at least one SRS resource, a transmission timing of the at least one SRS resource, a subcarrier spacing (SCS), a duration, and/or a transmission bandwidth of the at least one SRS resource. Note that a MsgA contains a RACH preamble and PUSCH, and the PUSCH carries DMRS. As such, if the RACH message(s) 822 are MsgAs, either the preamble or the DMRS or both can be used for positioning.

More specifically, in an aspect, the configured association may relate an uplink spatial transmit filter (also referred to as an uplink transmit beam) of the at least one SRS resource (or SRS resource set) to the at least one RACH resource. In that case, the UE 804 can transmit a PRACH preamble (e.g., a PRACH preamble for Msg1 or MsgA) on the at least one RACH resource using the uplink spatial transmit filter of the at least one SRS resource. Additionally or alternatively, the configured association may relate a path-loss reference resource, path-loss estimate, and/or transmission power estimate of the at least one SRS resource (or SRS resource set) to the at least one RACH resource. In that case, the UE 804 can transmit a PRACH preamble on the at least one RACH resource using the transmission power estimate, path-loss estimate, and/or the path-loss reference resource of the at least one SRS resource. Additionally or alternatively, the configured association may relate a transmission timing of the at least one SRS resource (or SRS resource set) with the at least one RACH resource. In that case, the UE 804 can transmit a PRACH preamble on the at least one RACH resource using the transmission timing of the at least one SRS resource. Additionally or alternatively, the configured association may relate a first SCS, a first duration, and/or a first transmission bandwidth of the at least one SRS resource (or SRS resource set) with the at least one RACH resource. In that case, the UE 804 can transmit a PRACH preamble on the at least one RACH resource using a second SCS, a second duration, and/or a second transmission bandwidth that is based on the first SCS, the first duration, and/or the first transmission bandwidth of the at least one SRS resource.

Referring to the SCS, duration, and/or transmission bandwidth of the at least one SRS resource (or SRS resource set) in more detail, the at least one SRS resource may have a difference SCS, duration, and/or transmission bandwidth than is permitted for a RACH resource. As such, there may need to be a mapping between the SCS of the at least one SRS resource and the SCS of the at least one RACH resource, the duration of the at least one SRS resource and the duration of the at least one RACH resource, and/or transmission bandwidth of the at least one SRS resource and the transmission bandwidth of the at least one RACH resource. Such mappings may be defined by the relevant standard. These mappings may take the form of one or more rules. For example, a rule may state that if the duration of the at least one SRS resource is greater than 'X,' then select 'Y' for the duration of the at least one RACH resource.

When the UE 804 transmits the RACH messages 822, it needs to identify itself to the receiving TRP 802 in each RACH resource. To do this, as a first option, each TRP 802 may be provided a one-to-one mapping of a RACH occasion to a UE. That is, each UE (e.g., UE 804) would be associated with its own RACH occasions(s). This mapping may be provided by the location server (e.g., location server 230, LMF 270, SLP 272) or a TRP (e.g., the serving TRP). As a second option, an identifier of the UE 804 could be conveyed to the network in the Msg3 or MsgA payload. As a third option, there may be some association of the UE 804 to the respective RACH resources. For example, a RACH preamble index may be mapped to a specific UE. This information could be provided by either the location server or a TRP (e.g., the serving TRP). As a fourth option, a group of UEs could be associated with a set of one or more RACH resources, one or more RACH occasions, one or more RACH preamble indexes, or any combination thereof, and the UE 804 may provide a shorter identifier in the RACH message payload that uniquely identifies the UE 804 within that group. Again, this mapping could be provided by the location server or a TRP (e.g., the serving TRP).

There may also need to be a triggering mechanism to inform the involved TRPs (here, TRPS 802-1 and 802-2) to monitor for the associated RACH resources instead of the SRS-for-positioning resources. As a first option, the serving TRP (e.g., one of TRP 802-1 and 802-2) may inform the location server (e.g., location server 230, LMF 270, SLP 272), which may inform the neighboring TRPs (e.g., the other of TRP 802-1 and 802-2). As a second option, the serving TRP may inform the neighboring TRPs directly over a backhaul link.

After the random access procedures (e.g., random access procedure 500/600) with the TRPs 802, the UE 804 is in a second RRC connected state 830 (e.g., RRC connected state 720). At this time, the UE 804 is configured (by, e.g., the location server 230, LMF 270, SLP 272) with a new set of one or more SRS resources (or SRS resource sets) for positioning purposes for each TRP 802. The UE 804 continues the positioning session by transmitting one or more SRS 832-1 to the TRP 802-1 on the newly configured SRS resources for the TRP 802-1, and transmitting one or more SRS 832-2 to the TRP 802-2 on the newly configured SRS resources for the TRP 802-2. Sometime after entering the second RRC connected state 830, the UE 804 may receive a second association of at least one SRS resource (or SRS resource set) of the set of one or more SRS resources allocated for each TRP 802 to at least one RACH resource of one or more RACH resources allocated for each TRP 802. Again, the UE 804 may receive the association from the serving TRP (e.g., one of TRP 802-1 and 802-2) or from the respective TRPs 802. The UE 804 may store this association until the next time it transitions to the RRC idle or disconnected state during the same positioning session. Thus, as will be appreciated, the UE 804 may repeat the above operations until the positioning session is complete.

Because the RACH message(s) 822 are transmitted as part of an ongoing positioning session, the TRPs 802 perform positioning measurements (e.g., ToA, AoA) of the SRS 812, the RACH message(s) 822, and the SRS 832. The TRPs 802 may then report these measurements to a positioning entity, such as a location server (e.g., location server 230, LMF 270, SLP 272), the UE 804 (for UE-based positioning), or the serving TRP (e.g., one of TRPs 802-1 and 802-2). If the positioning session is a multi-RTT session, the TRPs 802 may transmit downlink reference signals in response to the received SRS 812, the RACH message(s) 822, and the SRS 832. As is known in the art, the payloads of these response signals may include the amount of time between the reception of the SRS 812, the RACH message(s) 822, and the SRS 832 and the transmission of the response signals (i.e., the TRPs' 802 Rx-Tx measurements). Alternatively, the TRPs 802 may transmit this information to the positioning entity. The location of the UE 804 can then be estimated using known techniques.

As will be appreciated, the various network nodes described above may communicate over different interfaces and using different protocols. For example, the UE 804 may communicate with the location server, and vice versa, using LTE positioning protocol (LPP) signaling. The TRPs 802 may communicate with the location server using LTE positioning protocol type A (LPPa) or NR positioning protocol type A (NRPPa) signaling. The TRPs 802 may communicate with each other over a backhaul connection (e.g., backhaul connection 223). The UE 804 may communicate with the TRPs 802 using a wireless cellular protocol, such as the LTE or NR protocol.

Figure 9:
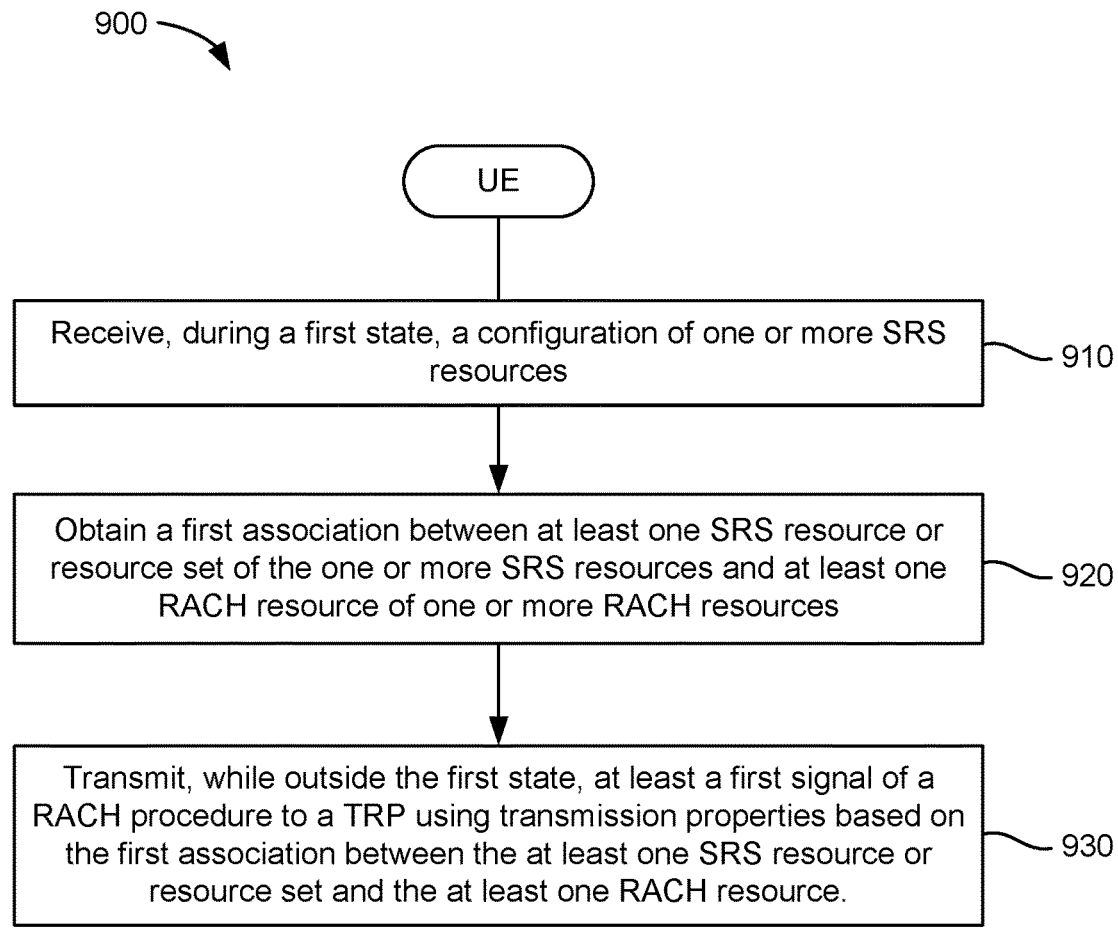
FIGS. 9 and 10 illustrate methods of wireless communication, according to aspects of the disclosure.

FIG. 9 illustrates an exemplary method 900 of wireless communication, according to aspects of the disclosure. The method 900 may be performed by a UE (e.g., any of the UEs described herein, such as UE 804).

At 910, the UE receives, during a first state (e.g., RRC connected state 720), a configuration of one or more SRS resources (e.g., one or more SRS resources or one or more SRS resource sets). The one or more SRS resources may be specifically configured for positioning. In an aspect, operation 910 may be performed by WWAN transceiver 310, processing system 332, memory component 340, and/or positioning component 342, any or all of which may be considered means for performing this operation.

At 920, the UE obtains a first association between at least one SRS resource or resource set of the one or more SRS resources and at least one RACH resource of one or more RACH resources. The one or more RACH resources may be allocated for the UE to transmit RACH messages to a particular TRP. The UE may obtain the first association during the first state or during a previous RRC connected state 720. In an aspect, operation 920 may be performed by WWAN transceiver 310, processing system 332, memory component 340, and/or positioning component 342, any or all of which may be considered means for performing this operation.

At 930, the UE transmits, while outside the first state (e.g., while in the RRC disconnected/idle state 710 or RRC inactive state 730), at least a first signal of a RACH procedure (e.g., Msg1, Msg3, MsgA) to the TRP using transmission properties based on the first association between the at least one SRS resource or resource set and the at least one RACH resource. In an aspect, operation 930 may be performed by WWAN transceiver 310, processing system 332, memory component 340, and/or positioning component 342, any or all of which may be considered means for performing this operation.

Figure 10:
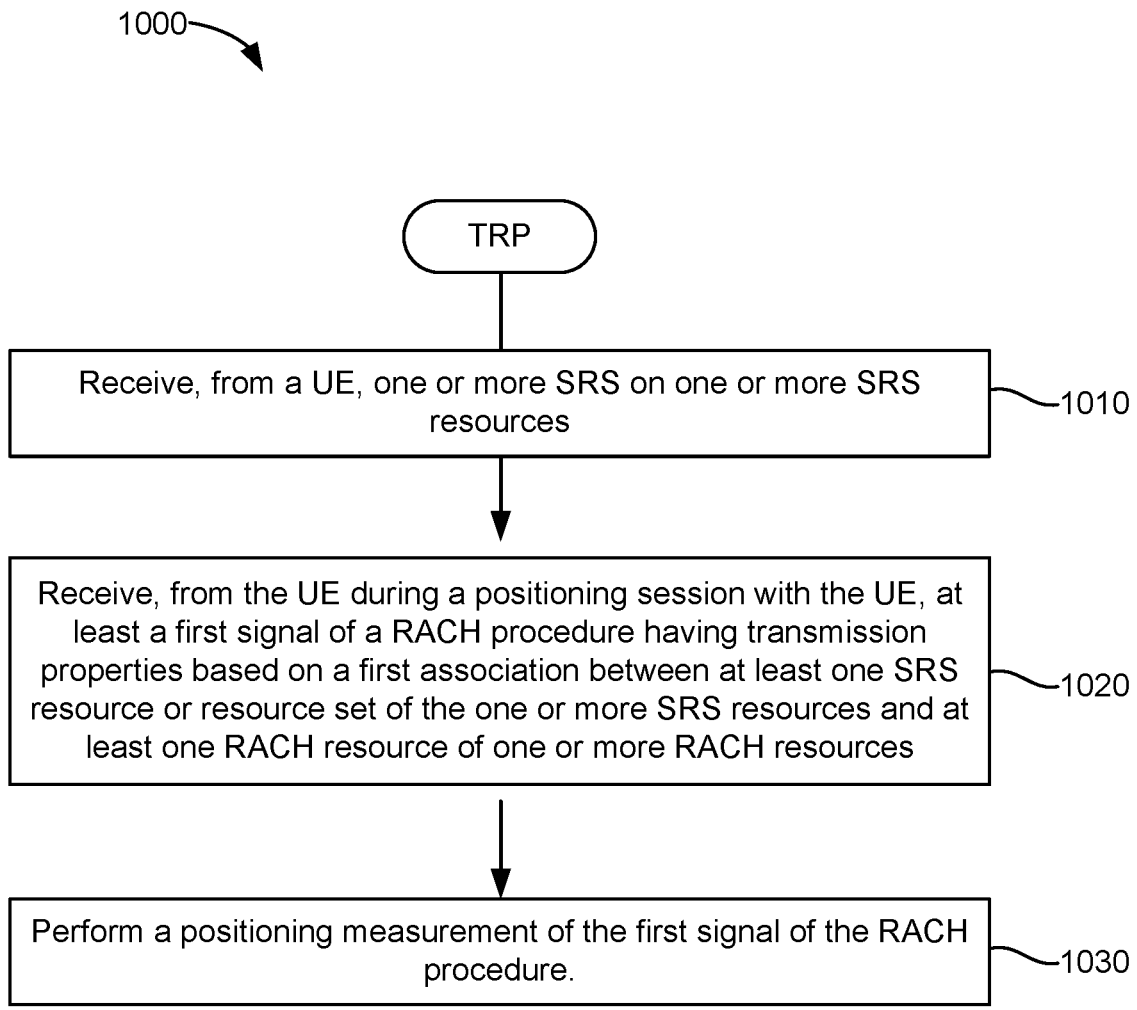

FIG. 10 illustrates an exemplary method 1000 of wireless communication, according to aspects of the disclosure. The method 1000 may be performed by a TRP (e.g., any of the base stations, or TRPs of any of the base stations, described herein, such as one of TRPs 802).

At 1010, the TRP receives, from a UE (e.g., any of the UEs described herein, such as UE 804), one or more SRS on one or more SRS resources. The one or more SRS resources may be specifically configured for positioning. In an aspect, operation 1010 may be performed by WWAN transceiver 350, processing system 384, memory component 386, and/or positioning component 388, any or all of which may be considered means for performing this operation.

At 1020, the TRP receives, from the UE during a positioning session (e.g., a multi-RTT session, an UL-TDOA session, or an AoA session) with the UE, at least a first signal of a RACH procedure (e.g., Msg1, Msg3, MsgA) having transmission properties based on a first association between at least one SRS resource or resource set of the one or more SRS resources and at least one RACH resource of one or more RACH resources. In an aspect, operation 1020 may be performed by WWAN transceiver 350, processing system 384, memory component 386, and/or positioning component 388, any or all of which may be considered means for performing this operation.

At 1030, the TRP performs a positioning measurement (e.g., ToA, AoA) of the first signal of the RACH procedure. In an aspect, operation 1030 may be performed by WWAN transceiver 350, processing system 384, memory component 386, and/or positioning component 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
at least one transceiver; and
at least one processor communicatively coupled to the memory and the at least one transceiver, the at least one processor configured to:
receive, during a first state, a configuration of one or more sounding reference signal (SRS) resources;
obtain a first association between at least one SRS resource or resource set of the one or more SRS resources and at least one random access channel (RACH) resource of one or more RACH resources allocated for a subsequent RACH procedure; and
cause the at least one transceiver to transmit, while outside the first state, at least a first signal of the RACH procedure to a transmission-reception point (TRP) using transmission properties based on the first association between the at least one SRS resource or resource set and the at least one RACH resource.

2. The UE of claim 1, wherein the at least one processor being configured to obtain the first association comprises the at least one processor being configured to:
receive the first association from a serving TRP during the first state; or
determine the first association.

3. The UE of claim 1, wherein the at least one processor is further configured to:
receive, during a second state, a configuration of one or more second SRS resources; and
receive a second association between at least one SRS resource of the one or more second SRS resources and at least one RACH resource of one or more second RACH resources,
wherein the second state comprises a radio resource control (RRC) connected state.

4. The UE of claim 1, wherein:
the transmission properties comprise an uplink spatial transmit filter of the at least one SRS resource or resource set, and
the at least one processor is further configured to cause the at least one transceiver to transmit a physical random access channel (PRACH) preamble on the at least one RACH resource using the uplink spatial transmit filter of the at least one SRS resource or resource set.

5. The UE of claim 1, wherein:
the transmission properties comprise a path-loss reference resource, path-loss estimate, and/or transmission power estimate of the at least one SRS resource or resource set, and the at least one processor is further configured to cause the at least one transceiver to transmit a PRACH preamble on the at least one RACH resource using the transmission power estimate, path-loss estimate, and/or the path-loss reference resource of the at least one SRS resource or resource set.

6. The UE of claim 1, wherein:
the transmission properties comprise a transmission timing of the at least one SRS resource or resource set, and
the at least one processor is further configured to cause the at least one transceiver to transmit a PRACH preamble on the at least one RACH resource using the transmission timing of the at least one SRS resource or resource set.

7. The UE of claim 1, wherein:
the transmission properties comprise a first subcarrier spacing (SCS), a first duration, a first transmission bandwidth, or any combination thereof of the at least one SRS resource or resource set, and
the at least one processor is further configured to cause the at least one transceiver to transmit a PRACH preamble on the at least one RACH resource using a second SCS, a second duration, a second transmission bandwidth, or any combination thereof that is based on the first SCS, the first duration, the first transmission bandwidth, or any combination thereof of the at least one SRS resource or resource set.

8. The UE of claim 1, wherein the first signal of the RACH procedure comprises a RACH Message A, a RACH Message 1, a RACH Message 3, a demodulation reference signal (DMRS) of a RACH Message A, or a DMRS of a RACH Message 3.

9. The UE of claim 1, wherein the at least one processor is further configured to:
indicate an identifier of the UE to the TRP during transmission of the first signal of the RACH procedure.

10. The UE of claim 9, wherein the identifier of the UE is included in a payload of a RACH Message A when the RACH procedure is a two-step RACH procedure or a payload of a RACH Message 3 when the RACH procedure is a four-step RACH procedure.

11. The UE of claim 9, wherein:
the identifier of the UE is indicated to the TRP based on an association between the UE and one or more RACH preamble indexes,
the identifier of the UE is indicated to the TRP based on a one-to-one mapping between the UE and at least one RACH occasion, or
the identifier of the UE is indicated to the TRP based on the UE being a member of a group of UEs associated with the at least one RACH resource, a RACH occasion, a RACH preamble index, or any combination thereof.

12. The UE of claim 11, wherein the identifier of the UE is unique within the group of UEs and is included in the first signal of the RACH procedure.

13. The UE of claim 1, wherein the one or more RACH resources comprise a set of time, frequency, and/or sequence resources allocated for transmission of at least the first signal of the RACH procedure.

14. The UE of claim 1, wherein the configuration of the one or more SRS resources is at least for a positioning session for the UE.

15. The UE of claim 14, wherein the positioning session comprises an uplink time difference of arrival (UL-TDOA) session, a multi-round-trip-time (multi-RTT) session, an AoA session, or any combination thereof.

16. The UE of claim 14, wherein:
the positioning session comprises a multi-RTT session, and
the at least one processor is further configured to:
report one or more reception-to-transmission (Rx-Tx) measurements; and
report an SRS resource or resource set identifier, a RACH occasion, a RACH preamble index, or a RACH slot associated with the one or more reported Rx-Tx measurements.

17. The UE of claim 1, wherein the first state comprises a radio resource control (RRC) connected state.

18. The UE of claim 1, wherein the first association is received during the first state.

19. A transmission-reception point (TRP), comprising:
a memory;
at least one transceiver; and
at least one processor communicatively coupled to the memory and the at least one transceiver, the at least one processor configured to:
receive, from a user equipment (UE), one or more sounding reference signals (SRS) on one or more SRS resources;
receive, from the UE during a positioning session with the UE, after reception of the one or more SRS on the one or more SRS resources, at least a first signal of a random access channel (RACH) procedure having transmission properties based on a first association between at least one SRS resource or resource set of the one or more SRS resources and at least one RACH resource of one or more RACH resources allocated for the RACH procedure; and
perform a positioning measurement of the first signal of the RACH procedure.

20. The TRP of claim 19, wherein the at least one processor is further configured to:
cause the at least one transceiver to transmit the first association to the UE.

21. The TRP of claim 19, wherein:
the transmission properties comprise an uplink spatial transmit filter of the at least one SRS resource or resource set, and
the at least one processor is further configured to receive a physical random access channel (PRACH) preamble on the at least one RACH resource that uses the uplink spatial transmit filter of the at least one SRS resource or resource set.

22. The TRP of claim 19, wherein:
the transmission properties comprise a path-loss reference resource, path-loss estimate, and/or transmission power estimate of the at least one SRS resource or resource set, and
the at least one processor is further configured to receive a PRACH preamble on the at least one RACH resource that uses the transmission power estimate, the path-loss estimate, and/or the path-loss reference resource of the at least one SRS resource or resource set.

23. The TRP of claim 19, wherein:
the transmission properties comprise a transmission timing of the at least one SRS resource or resource set, and
the at least one processor is further configured to receive a PRACH preamble on the at least one RACH resource that uses the transmission timing of the at least one SRS resource or resource set.

24. The TRP of claim 19, wherein:
the transmission properties comprise a first subcarrier spacing (SCS), a first duration, a first transmission bandwidth, or any combination thereof of the at least one SRS resource or resource set, and the at least one processor is further configured to receive a PRACH preamble on the at least one RACH resource that uses a second SCS, a second duration, a second transmission bandwidth, or any combination thereof that is based on the first SCS, the first duration, the first transmission bandwidth, or any combination thereof of the at least one SRS resource or resource set.

25. The TRP of claim 19, wherein the at least one processor is further configured to:

receive an indication of an identifier of the UE when receiving the first signal of the RACH procedure, wherein the identifier of the UE is included in a payload of a RACH Message A when the RACH procedure is a two-step RACH procedure or a payload of a RACH Message 3 when the RACH procedure is a four-step RACH procedure.

26. The TRP of claim 25, wherein:

the identifier of the UE is indicated based on an associated between the UE and a specific RACH preamble index, the identifier of the UE is indicated based on a one-to-one mapping between the UE and at least one RACH occasion, or the identifier of the UE is indicated based on the UE being a member of a group of UEs associated with the at least one RACH resource, a RACH occasion, a RACH preamble index, or any combination thereof.

27. The TRP of claim 19, wherein the at least one processor is further configured to:

receive, from a location server or another TRP, a trigger to perform the positioning measurement of the first signal of the RACH procedure.

28. The TRP of claim 19, wherein the at least one processor is further configured to:

cause the at least one transceiver to transmit a trigger to perform the positioning measurement of the first signal of the RACH procedure to another TRP.

29. A method of wireless communication performed by a user equipment (UE), comprising:

receiving, during a first state, a configuration of one or more sounding reference signal (SRS) resources;

obtaining a first association between at least one SRS resource or resource set of the one or more SRS resources and at least one random access channel (RACH) resource of one or more RACH resources allocated for a subsequent RACH procedure; and transmitting, while outside the first state, at least a first signal of the RACH procedure to a transmission-reception point (TRP) using transmission properties based on the first association between the at least one SRS resource or resource set and the at least one RACH resource.

30. A method of wireless communication performed by a transmission-reception point (TRP), comprising:

receiving, from a user equipment (UE), one or more sounding reference signals (SRS) on one or more SRS resources;

receiving, from the UE during a positioning session with the UE, after reception of the one or more SRS on the one or more SRS resources, at least a first signal of a random access channel (RACH) procedure having transmission properties based on a first association between at least one SRS resource or resource set of the one or more SRS resources and at least one RACH resource of one or more RACH resources allocated for the RACH procedure; and performing a positioning measurement of the first signal of the RACH procedure.

* * * * *